United States Patent [19]

Shellhause

[11] 4,114,377
[45] Sep. 19, 1978

[54] MASTER CYLINDER ASSEMBLY

[75] Inventor: Ronald L. Shellhause, Vandalia, Ohio

[73] Assignee: General Motors Corporation, Detroit, Mich.

[21] Appl. No.: 741,158

[22] Filed: Nov. 11, 1976

[51] Int. Cl.² .............................................. B60T 11/20
[52] U.S. Cl. ...................................... 60/589; 60/562; 251/339
[58] Field of Search ................. 60/562, 589, 588, 592; 251/339

[56] References Cited

U.S. PATENT DOCUMENTS

| 3,262,273 | 7/1966 | Harvey | 60/589 |
| 3,555,822 | 1/1971 | Rivetti | 60/589 |
| 3,701,257 | 10/1972 | Gaiser | 60/562 |
| 3,795,111 | 3/1974 | Haraikawa | 60/589 |
| 3,854,499 | 12/1974 | Sievenpiper | 251/339 |

FOREIGN PATENT DOCUMENTS 62,951  6/1952  France ...................................... 60/589

Primary Examiner—Martin P. Schwadron
Assistant Examiner—Abraham Hershkovitz
Attorney, Agent, or Firm—D. D. McGraw

[57] ABSTRACT

A master cylinder has tilt compensating valves including positioning stop collars that catch the portions of master cylinder piston assemblies to position the tilt compensating valves axially during assembly and eliminate travel losses required to close the valves which otherwise occur due to tolerance variations. A rubber seal holds each valve assembly in position once a valveretaining nut is tightened. The master cylinder piston positions are set at a gage dimension before tightening the valve nuts. The valves are therefore so positioned that they close upon a predetermined minimum amount of piston movement at the beginning of master cylinder actuation. The valve nuts may be tightened after the master cylinder is connected to the push rod assembly or a power brake unit, thus eliminating additional tolerance losses caused by push rod or booster variations. The tilt valves have very short stem lengths in relation to valve seat opening diameters in order to obtain maximum valve opening with minimum piston travel in the bore.

2 Claims, 3 Drawing Figures

MASTER CYLINDER ASSEMBLY

The invention relates to a master cylinder having one or more tilt compensating valves and more particularly to one in which such valves are automatically adjusted for tolerance variations during assembly. In a typical dual master cylinder, tolerances on the order of 0.10 inches may exist in the location of drilled bypass holes in relation to the positions of the primary seals of the pistons. Tilt valve mechanisms provide similar losses, particularly if two tilt valves are employed, unless special measures are taken such as selective fit of parts. Instead of requiring selective fits, the invention is directed to providing for accommodation of these tolerances during assembly. It has been found that a master cylinder of the type disclosed and embodying the invention can limit total push rod travel losses to a range of 0.012 to 0.022 inches. This provides a minimum savings in push rod travel loss in an amount of 0.078 inches, which at a 6.5:1 pedal ratio will give greater than 0.5 inches reduction in initial pedal travel losses on manual brake cylinders. The tilt compensating valves of the invention operate in their normal function once they are installed. They provide a system connection to the master cylinder reservoir in the released position and allow make-up fluid to pass through the master cylinder and into the brake circuitry during any release stroke which creates sufficient negative pressure to pull the valves open. They provide compensation and thermal expansion or contraction for the brake fluid in the brake circuits.

The tilt valve mechanisms, also referred to as compensating means, are installed in compensating passages formed in the master cylinder housing and connecting with the master cylinder bore. The passages each have an annular shoulder on which a tilt valve assembly is mounted. Each tilt valve mechanism includes a flanged valve seat and a tilt valve which is continually urged by a valve spring toward seat engagement with the valve seat. The valve seat extends through the annular shoulder with the end of the tilt valve extending into the master cylinder bore. Each tilt valve is operably engageable by a portion of its associated piston assembly to open the compensating passage when the piston assembly is in the retracted non-pressurizing position. Each tilt valve is disengaged by its piston assembly to close its compensating passage upon a predetermined movement of the piston assembly in a fluid pressurizing direction in the master cylinder bore. The portion of the compensating passage between the annular shoulder and the master cylinder bore is larger in cross section at least in the bore axial directions than the section of the portion of the compensating means which extends through the annular shoulder. This permits limited adjustment movements of the compensating means in directions parallel to the axis of the bore, the flanged valve seats moving with the tilt valves to the correct position. After the assembly of the master cylinder is completed, a retainer is secured against the flanged valve seat of each compensating means to hold it in the adjusted position and prevent movement thereafter.

Figure 1:
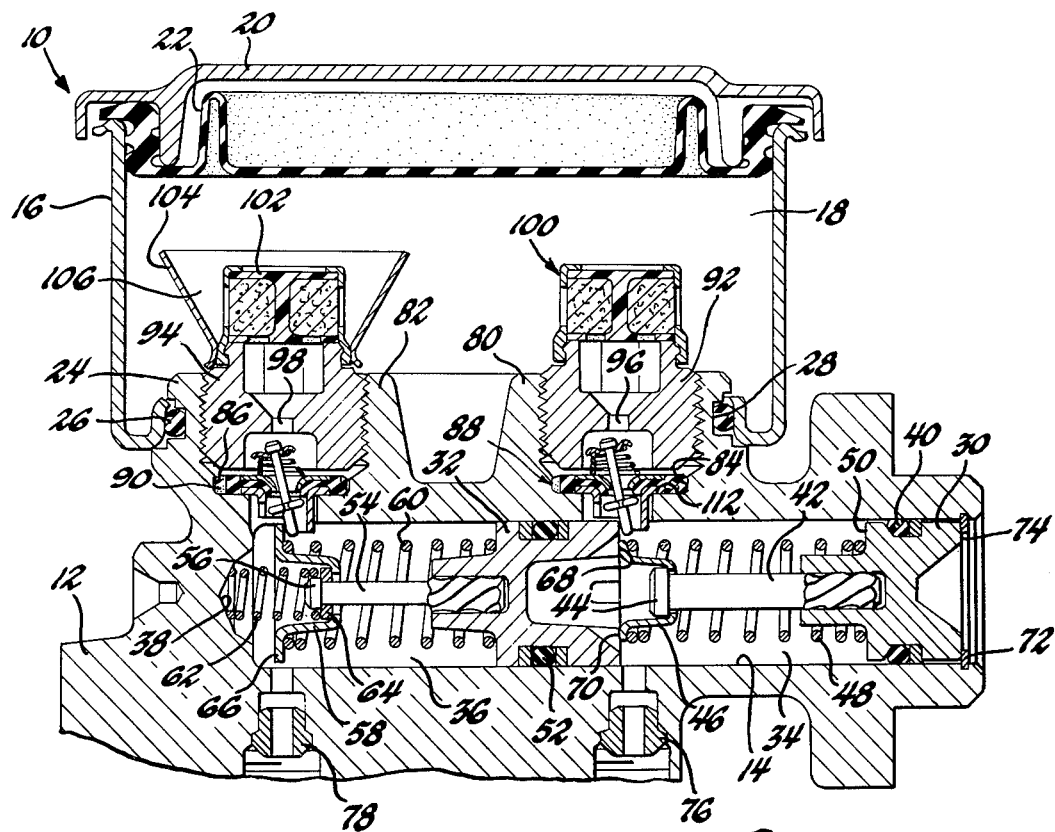
FIG. 1 is a cross section view of a master cylinder assembly embodying the invention.

The master cylinder assembly 10 is of the dual master cylinder type and employs two tilt valve type compensating mechanisms embodying the invention. When the master cylinder is of the single pressurizing chamber type, only one such compensating mechanism is needed; conversely, if a master cylinder with more than two pressurizing chambers is required, additional compensating mechanisms may be provided. The assembly includes a housing 12 having a bore 14 therein, and a reservoir housing 16 sealingly secured to the housing 12 and defining a brake fluid reservoir chamber 18. A reservoir cover 20 and sealing diaphragm 22 are provided to close the top of housing 16. The bottom of the housing 16 fits about a boss 24 and is sealed to the boss by an O-ring 26 which fits within a groove 28 on the outer periphery of the boss 24. Other suitable fastening and sealing arrangements may be provided.

A pair of pressurizing pistons 30 and 32 are reciprocably received in bore 14 in spaced relation so that a primary pressurizing chamber 34 is defined between pistons 30 and 32 and a secondary pressurizing chamber 36 is defined between piston 32 and the forward end 38 of bore 14. Piston 30 has a seal 40 which cooperates with the surface wall of bore 14 to prevent fluid leakage past the piston. A stud 42 with a head 44 is secured to the forward end of piston 30 and has a spring retainer 46 mounted on it for reciprocal movement. A caged primary piston spring 48 is fitted about stud 42 with one end engaging retainer 46 and the other end engaging the forward face 50 of piston 30. Piston 32 is similarly constructed with a seal 52, stud 54, stud head 56, spring retainer 58 and secondary piston spring 60. A piston return spring 62 is received in the forward end of bore 14 with one end seating on bore end 38 and the other end seating on an annular spring seat 64 on stud 54 between stud head 56 and the inner portion of spring retainer 58. The outer flange 66 of spring retainer 58 extends radially outward so that its outer periphery is adjacent to but spaced from the surface wall of bore 14. In the position shown in FIG. 1, the caged springs 48 and 60 are extended to their maximum extents, with the spring retainers 46 and 58 being operatively positioned against stud heads 44 and 56. The primary caged spring 48 has the highest pre-load, secondary caged spring 60 having lesser pre-load, and return spring 62 having the least pre-load. The after face 68 of piston 32 engages the outer flange 70 of retainer 46. The pre-load of spring 62 therefore maintains the piston assemblies in a stacked position with reference to the piston stop 72 provided in the open end of bore 14 and engaged by the after face 74 of piston 30. This provides for precise positioning of the after face 68 of piston 32 and the outer flange 66 of retainer 58 for purposes to be described. Outlet ports 76 and 78 are respectively provided for pressurizing chambers 34 and 36 and are suitably connected to brake actuating circuits.

The upper side of housing 12 having boss 24 formed as a part of the housing is arranged to divide the boss into two boss sections 80 and 82. These sections extend upwardly into the reservoir chamber 18. Boss section 80 has a compensating passage 84 extending through it so as to connect chamber 18 and the portion of bore 14 defining primary pressurizing chamber 34. Boss section 82 has compensating passage 86 formed therethrough and connecting reservoir chamber 18 with the portion of bore 14 defining secondary pressurizing chamber 36.

The compensating passages 84 and 86 are respectively axially positioned in the areas where secondary piston after face 68 and spring retainer outer flange 66 are positioned when the master cylinder is in the retracted position shown. Compensating means 88 is received in passage 84 and compensating means 90 is received in passage means 86. A retaining nut 92 is threaded into the upper portion of passage 84 and functions to retain compensating means 88 in position as will be further described. Similarly, retaining nut 94 is threaded into passage 86 for retaining compensating means 90. Nut 92 has a passage 96 formed axially therethrough, and nut 94 has a similar passage 98. Passages 96 and 98 have their upper portions formed as hex sockets so that the nuts may be tightened into position. Filter assemblies 100 and 102 are respectively snapped into position on the upper ends of nuts 92 and 94 after the nuts have been tightened. The filter assemblies provide for hydraulic fluid flow between reservoir chamber 18 and the master cylinder bore 14 with no substantial restriction while assuring that the hydraulic fluid supplied to the bore is clean. Nut 94 is illustrated as also having a sub-reservoir body 104 attached thereto so that a sub-reservoir chamber 106 is defined within chamber 18.

Figure 2:
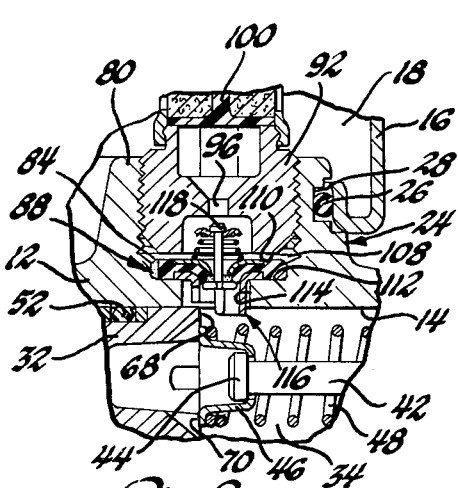
FIG. 2 is a cross section view of one of the tilt valve compensating means of the master cylinder of FIG. 1 and showing the tilt valve in the closed position.
Figure 3:
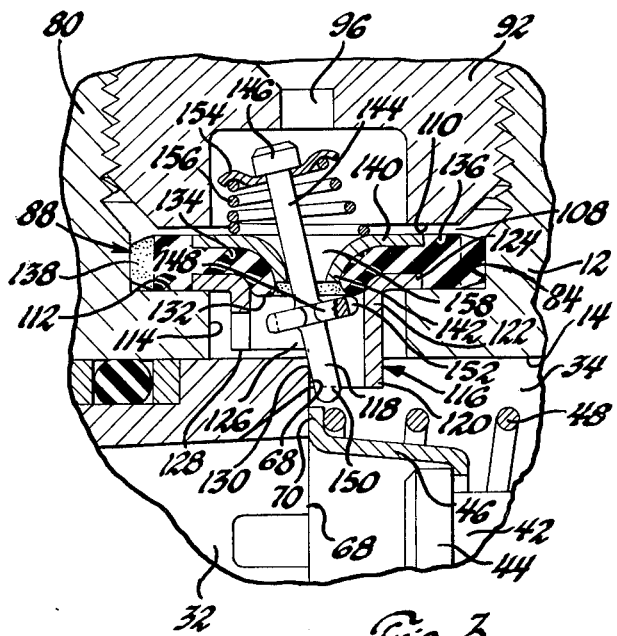
FIG. 3 is similar to FIG. 2, and shows the tilt valve in the open position.
Figure 3:
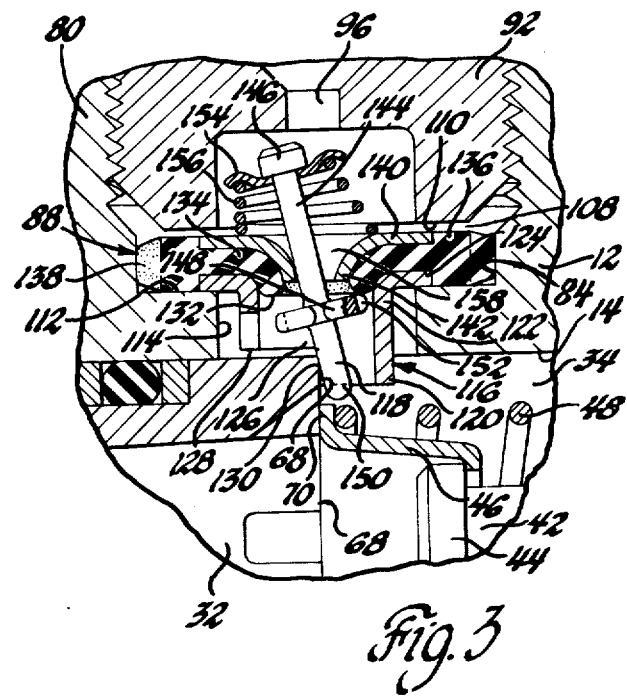

Since the compensating means 88 and 90 are identical in construction, only compensating means 88 will be further described, the same reference numerals being provided on compensating means 90 for identification as necessary. Compensating means 88 is shown in additional detail in FIGS. 2 and 3. Passage 84 has an enlarged section 108, the upper portion of which is threaded to receive nut 92. The lower portion below the lower end surface 110 of nut 92 receives a part of the compensating means 88 and is divided by an annular shoulder 112 from the smaller section 114 which opens into primary pressurizing chamber 34. Compensating means 88 includes a valve seat assembly 116 and a tilt valve assembly 118. Seat assembly 116 has a flanged tube section 120, with the tube body portion 122 extending into and through the smaller section 114 of passage 84. The flange portion 124 of tube section 120 extends radially outward so that it rests on shoulder 112. The flange portion 124 is sufficiently large to rest on the shoulder during all positions of the tube body portion 122 relative to passage section 114. The outer diameter of tube body portion 122 is sufficiently smaller than the diameter of passage section 114 to permit movements of the compensating means generally axially of the bore 14. While it is most simple to provide passage section 114 as a circular opening, it could be provided in other shapes so long as it has sufficient clearance in directions parallel to the axis of bore 14 to permit the desired movements of compensating means 88. As can be seen particularly well in FIGS. 2 and 3, approximately the forward half of tube body portion 122 is cut away at 126 to provide a positioning stop collar. The lower end 128 of that forward half of tube body portion 122 does not extend into bore 14, and is preferably positioned slightly above the bore surface wall. This also provides diametrically spaced abutting surfaces, one such surface 130 being shown in the drawing. This surface is in abuttable relation with the after face 68 of piston 32 but is radially clear of spring retainer flange 70 and spring 48. It will be noted that the similar parts of compensating means 90 are positioned in abuttable engagement with flange 66 of the spring retainer 58.

The valve seat assembly 116 has an annular rubber-like seat 132, with the valve contact area of the seat extending slightly within the tube body portion 122. The seat also has a portion 134 extending radially outward over flange 124 and joining an enlarged peripheral portion 136. The outer periphery of peripheral portion 136 is fluted as shown at 138, with the extreme radially outward portions of the flutes engaging the side wall of passage enlarged section 108 between shoulder 112 and the lower end surface 110 of nut 92. An annular cap 140 is positioned over seat portion 134 with its inner peripheral portion 142 extending axially part way through seat 132.

The tilt valve assembly 118 includes a stem or pin 144 having a head 146 on its upper end and an annular flange forming a valve 148 generally intermediate the pin ends but more adjacent the pin lower end 150. Valve 148 has outer peripheral notches 152 which do not extend radially inward a sufficient distance to provide a passage through the valve when the valve is in engagement with its seat 132. Notches 152 are provided to assure sufficient cross section area for flow past the valve when the valve is open, while at the same time permitting the valve to be properly positioned within tube body section 122. The tilt valve assembly 118 also includes a spring seat 154 received on pin 144 and abutting head 146. A valve spring 156 is received about the upper portion of pin 144, with one end seated on spring seat 154 and the other end seated on the upper surface of cap 140 adjacent to but radially outward of the opening 158 defined by the cap inner peripheral portion 142. The pin 144 extends through opening 158, annular spring seat 132, and tube section 120. Valve 148 is positioned under seat 132 and the pin portion between valve 148 and pin end 150 is much shorter than the portion of the pin between the valve 148 and head 146. The pin length between valve 148 and pin end 150 is as short as possible in relation to the valve seat opening diameter in order to obtain maximum valve opening with minimum piston travel in the bore, as will be described. It can be seen that valve spring 156 tends to hold the valve 148 against seat 132, the valve opening relative to the seat when a force is applied to the pin lower end 150 causing the pin and valve to tilt from the position shown in FIG. 2 to the position shown in FIG. 3.

During assembly, the master cylinder primary and secondary piston assemblies are installed in the bore 14 and the piston stop 72 is inserted. The compensating means 88 and 90 are placed in passages 84 and 86 through the openings in which adjusting nuts 92 and 94 are then inserted. During insertion of the compensating means the piston assemblies are moved slightly forwardly in the bore to ensure that there is no interference between piston 32 and compensating means 88 or spring retainer 58 and compensating means 90. Due to the fluted arrangement of flutes 138 each compensating means is centrally positioned at this time. If the assembly is to be completed before attachment to the push rod assembly or power brake unit, the position of the piston assemblies is then established at a gage position. The piston assemblies are then permitted to retract to the gage position. Piston after face 68 initially engages the lower end 150 of its associated tilt valve assembly 118 and then engages the diametrically spaced surfaces 130. Similarly, flange 66 of spring retainer 58 engages the lower end 150 of the tilt valve of compensating means 88, and then engages the diametrically spaced surfaces 130 of that compensating means. The rearward movement of piston after face 68 and flange 66 to the gage position moves compensating means 88 and 90 axially rearward relative to the axis of bore 14 to the position which will allow for the various tolerances in the piston assemblies. Nuts 92 and 94 are then tightened, engaging the caps 140 and the outer peripheral portions 136 of the valve seats, compressing these outer peripheral portions and therefore locking the compensating means in place. The flexibility of flutes 138, together with the spaces between these flutes, permit the adjusting movements of the compensating means as well as the compression to a locking position. Once locked in place, the total travel losses are minimized. This is obtained in part by the design of the tilt valves wherein the shortest possible lower pin length to valve seat opening diameter allows the valves to close upon minimum forward piston travel.

If the final assembly and positioning of the compensating means is deferred until the master cylinder is connected with the push rod assembly for manual brakes or the power brake unit for power brakes, and the valve retaining nuts 92 and 94 are then tightened, the installation eliminates additional tolerance loss caused by push rod or booster variations. This avoids the use of selective fit push rods and transfers all tolerance losses to total stroke capability. As noted above, this can save as much as 0.5 inches or more in initial pedal travel losses.

Once installed, the tilt compensating valve mechanisms operate in their normally functioning manner. They provide a system connection to the reservoir in the released position and allow make-up fluid to enter the master cylinder bore when sufficient negative pressure exists in either of the chambers 34 and 36. They are held in the open position when the master cylinder is fully released.

What is claimed is:

1. A master cylinder assembly comprising:
    a housing having an axially extending bore therein, said bore having an axis;
    piston means reciprocably movable in said housing bore in an axial direction along said bore axis and defining therewith hydraulic fluid pressurizing chamber means;
    reservoir means for hydraulic fluid;
    compensating passage means in said housing for selectively communicating hydraulic fluid between said reservoir means and said pressurizing chamber means and having a side wall and annular shoulder means formed therein;
    compensating means including flanged valve seat means and tilt valve means continually urged toward seating engagement with said valve seat means, said compensating means being mounted in said passage means with a portion of said flanged valve seat means engaging and extending through said annular shoulder means, and said tilt valve means extending through said annular shoulder means and into said bore, said flanged valve seat means having an annular rubber-like valve seat formed with the inner periphery thereof providing the valve seat engageable by said tilt valve means, said valve seat being formed with resilient flutes on the outer periphery thereof, said resilient flutes having radially outward portions engaging said compensating passage means side wall and tending to centrally position said compensating means radially in said passage means, said tilt valve means being adapted to be operatively engageable by said piston means to open said compensating passage means with said piston means in the retracted non-pressurizing position and operatively disengageable by said piston means to close said compensating passage means upon predetermined movement of said piston means in a fluid pressurizing direction in said bore after completion of assembly of the master cylinder assembly;
    said compensating passage means having a portion intermediate said annular shoulder means and said housing bore being of greater dimension at least in the housing bore axial directions than the similar dimension of the portion of said compensating means extending through said annular shoulder means, the difference in said dimensions permitting limited adjustment movement of said compensating means in directions parallel to the axis of said housing bore during assembly of the master cylinder assembly by radial compression of at least some of said resilient flutes;
    and holding means during master cylinder assembly initially retaining said compensating means while permitting the aforesaid adjustment movement with said compensating means being set in axial bore position relation by the movement of said piston means from a pressurizing position to the retracted non-pressurizing position engaging said compensating means, said holding means being adapted upon completion of assembly to then further act to secure said compensating means against further movement in housing bore axial directions relative to said housing.

2. In a master cylinder assembly having a pressurizing bore, a piston assembly reciprocably movable therein for pressurizing hydraulic fluid, a hydraulic fluid reservoir, and a passage connecting said reservoir and said bore and having a shoulder and a side wall;
    a tilt-valve compensating means comprising:
    a valve assembly having an annular flanged section engaging the passage shoulder, a smaller diameter tubular body section with a notched end extending through said passage into said bore and of lesser diameter than said passage whereby said valve assembly is linearly movable parallel to the axis of said bore, a valve seat formed as a part of said flanged section and having an inner peripheral surface forming the valve seat surface and an outer peripheral surface formed with resilient flutes having radially outward portions engaging said passage side wall and resiliently urging said valve assembly radially to a center position in said passage, said valve seat also having a portion radially intermediate said inner and outer peripheral surfaces engaging said shoulder in sealable relation, and a tilt valve extending through said flanged section and said body section and yieldably urged into normal seat-engaging relation with said valve seat surface;
    said piston assembly having a portion engageable with said body section notched end and said tilt valve and so engaging and linearly moving said valve assembly parallel to the axis of said bore, against the resilient centering force exerted by said flutes, upon a movement of said piston assembly from a pressurizable position in said bore to a predetermined gage position establishing the open position of said valve assembly wherein any movement of said piston assembly in the pressurizing direction permits tilt valve movement toward seat engagement and closure of said passage;

and means adapted to thereafter secure said valve assembly in position, while said piston assembly is at the predetermined gage position and engaging said body section notched end and said tilt valve, and to hold said valve seat radially intermediate portion in sealing engagement with said shoulder.

* * * * *

UNITED STATES PATENT AND TRADEMARK OFFICE
CERTIFICATE OF CORRECTION

PATENT NO. : 4,114,377

DATED : September 19, 1978

INVENTOR(S) : Ronald L. Shellhause

It is certified that error appears in the above–identified patent and that said Letters Patent are hereby corrected as shown below:

Title page, column 2, in the Abstract, line 8, "veretaining" should be -- ve retaining --.

Canceled the drawing figure on the title page and substitute the attached figure.

Signed and Sealed this

Thirty-first Day of July 1979

[SEAL]

Attest:

Attesting Officer

LUTRELLE F. PARKER
Acting Commissioner of Patents and Trademarks